March 28, 1950  M. J. E. GOLAY  2,502,319
METHOD AND APPARATUS FOR MEASURING RADIATION
Filed April 30, 1948  3 Sheets-Sheet 1
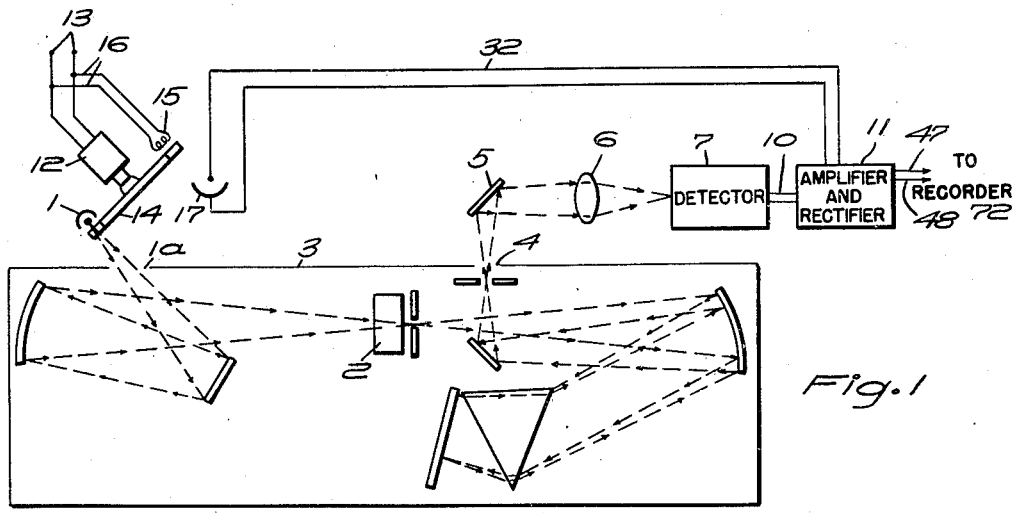
Fig.1
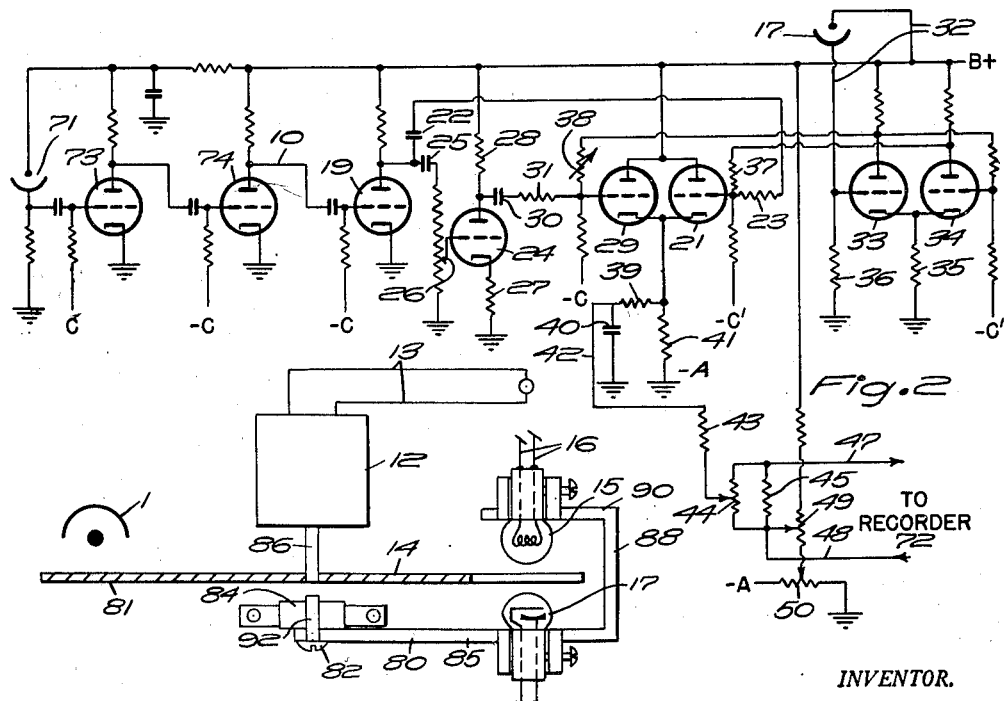
Fig.2
Fig.3
INVENTOR.
MARCEL J.E. GOLAY
BY Thomas A. Jenckes
ATTORNEY March 28, 1950        M. J. E. GOLAY        2,502,319
METHOD AND APPARATUS FOR MEASURING RADIATION
Filed April 30, 1948        3 Sheets-Sheet 2

Fig. 4a      1ST. PLATE OF FLIP FLOP

Fig. 4b      2ND. PLATE OF FLIP FLOP

Fig. 4c      AMPLIFIER OUTPUT

Fig. 4d      PHASE INVERTER OUTPUT

Fig. 4e      1ST. GRID OF RECTIFIER
RECTIFIER BEGINS TO CONDUCT AT THIS POINT.
2ND. GRID OF RECTIFIER

Fig. 4f      UNFILTERED RECTIFIER OUTPUT

INVENTOR.
MARCEL J.E. GOLAY
BY Thomas A. Jenches
ATTORNEY

INVENTOR.
MARCEL J. E. GOLAY
BY Thomas A. Jenckes
ATTORNEY

Patented Mar. 28, 1950

2,502,319

UNITED STATES PATENT OFFICE 2,502,319

METHOD AND APPARATUS FOR MEASURING RADIATION

Marcel J. E. Golay, Long Branch, N. J.

Application April 30, 1948, Serial No. 24,204

21 Claims. (Cl. 250—214)

My invention relates to photometric electronic circuits and is particularly applicable to any phase of spectroscopy in which the various portions of the spectrum under investigation are examined in turn by means of a detector yielding a quantitative measure of the energy received in the form of an electric current.

The main purpose of my invention is to provide a novel method of and apparatus for measuring radiation with a minimum of additive or multiplicative errors and a maximum of reliability.

One purpose of this invention is to provide means whereby the electrical output of a system detecting radiant energy is substantially freed from the phenomenon of zero drift, said means including no moving parts other than a radiation chopping disc.

Another purpose of this invention is to provide means whereby said electrical output is substantially freed from variations in the sensitivity of the radiation detecting system utilized, said means including no moving parts other than one or more radiation chopping discs.

Emphasis is placed upon the circumstance that my invention utilizes no break and make electrical contacts.

My invention comprises a novel method and apparatus for measuring radiation which comprises periodically interrupting the radiation to be measured and transforming the modulations of said interrupted radiation into variations in an output electrical current which forms a measure of said radiation. My invention also includes a modification of said method which comprises feeding back with the radiation to be measured a radiative differential which is a function of said radiation output current, which affects subtractively the radiation to be measured and hence the output current transmitted to the recorder, whereby errors in the measurement are limited to errors only in the small portion of the output current transmitted to the recorder, i. e., the total output current, minus said differential, and if such differential be 95% of the output current, limiting all errors to 5% only of the transmitted current, thereby lessening them twenty times.

These and such other objects of my invention as may hereinafter appear will be best understood from a description of the accompanying drawings illustrating various embodiments thereof.

In the drawings, Fig. 1 is a diagrammatic view shown in section and blocks, illustrating the general arrangement of parts constructed in accordance with an embodiment of my invention, designed to yield a drift free measurement of radiation.

Fig. 2 is an electric diagram of the circuit within the amplifier and rectifier block of the device shown in Fig. 1.

Fig. 3 is a plan view of a portion of the actual device looking at the upper edge of the chopping disc rotating on a horizontal axis, showing the movable mechanical mounting means I preferably employ for adjusting the phase of the interruptions of the fixed beam relative to the phase of the interruptions of the beam to be measured.

Figs. 4a, 4b, 4c, 4d, 4e, 4f and 4g illustrate the wave shapes of the voltages and currents at various points of the circuit shown in Fig. 2.

Figure 4G:
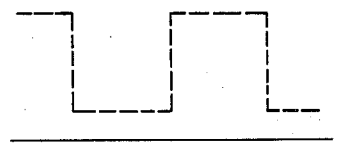
Figure 4G:
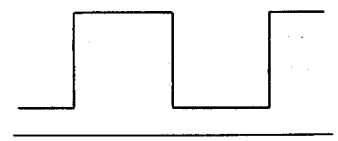
Figure 4G:
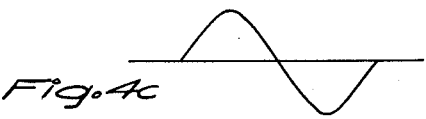
Figure 4G:
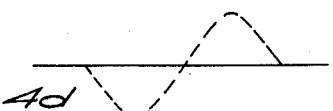
Figure 4G:
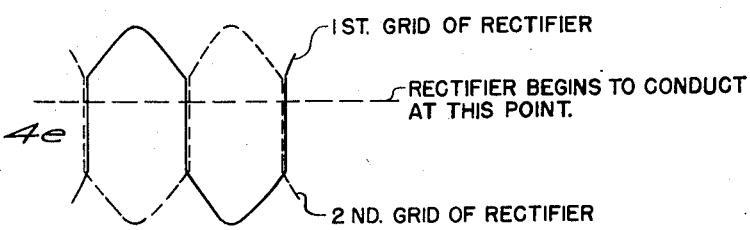
Figure 4G:
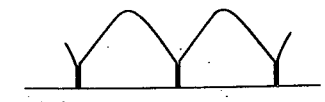
Figure 4G:

My method includes broadly improvements in the method of measuring radiation with the substantial elimination of drift which comprises periodically interrupting the radiation to be measured in a suitable manner, transforming said modulations of said interrupted radiation into a fluctuating radiation voltage, the amplitude of fluctuation of which is a function of said interrupted radiation, interrupting a fixed beam of radiation in time relationship with interruptions of said radiation to be measured and transforming modulations of said interrupted radiation of said fixed beam into a synchronized fluctuating electrical voltage having a substantially constant amplitude of fluctuation and having its phase determined by the interruptions of said fixed beam, superposing said fluctuating radiation voltage on said fluctuating synchronizing voltage and rectifying said superposed voltages to produce a direct electrical output current providing a measure of said radiation and, if desired, filtering the remaining fundamental components and the higher harmonics out of said electric output current and actuating a standard type of recorder by said output current to effect a measure of the radiation to be measured. As will be apparent, I preferably provide two fluctuating voltages of the radiation to be measured 180° out of phase with each other, and I also preferably provide from said fixed beam of radiation substantially square waves of substantially constant amplitude and having high voltage periods and low voltage periods which are substantially equal to each other in duration and to the interruption and non-interruption periods of said radiation to be measured. In accordance with a preferred embodiment of my invention, I preferably feed back with the radiation to be measured a radiative differential which is a function of the radiation output current, which affects subtractively the radiation to be measured and hence the output current transmitted to the recorder to reduce by the amount of said differential errors in the measurement.

While it is obvious to one skilled in the art that many embodiments of my improved method may be accomplished through various combinations of different electrical means, I have shown in the drawings several embodiments of my preferred type of apparatus for carrying out my improved method.

Referring to Fig. 1, radiation, preferably infra red radiation, from a source 1 which may be a Nerst lamp, a "globar" or other suitable device, is passed through the inlet slit 1A to the absorption cell 2 of a spectrograph 3. The portion of the radiation selected by the spectrograph 3 and emerging at exit slit 4 is imaged by a mirror 5 onto a lens 6, infra red if desired, which concentrates it onto the sensitive element of a detector 7, which may be a thermopile, bolometer, pneumatic infra red detector, photocell or any other detector of radiant energy which yields an electrical output. For the sake of illustration, a pneumatic detector 7 similar to that shown in my co-pending application Serial No. 776,754 and described in the Review of Scientific Instruments, volume 18, No. 5, page 359 of the May 1947 edition is shown in which incoming radiation causes a modulation of an auxiliary source of light, not shown, which is detected by the auxiliary photocell 71 shown in Fig. 2. The output of photocell 71 is conducted by a lead 10 to an amplifier rectifier 11 and the output of the amplifier rectifier 11 is conducted by leads 47 and 48' to a recorder 72. A synchronous motor 12, which can be a clock motor energized by a source of A. C. 13 carries a chopping disc 14 comprising a circular disc having a half ring cut out from one side thereof, which serves to interrupt periodically the radiation beam from source 1 to spectrograph 3, the interruptions being characterized by equal "on" and "off" periods. The output of detector 7 will, therefore, be a fluctuating current, the magnitude of the fluctuations of which are a measure of that part of the radiation beam interrupted by chopping disc 14 transmitted through the spectrograph 3, while the frequency and phase of these fluctuations are determined by the rotation of the chopping disc.

The light beam from a source of light 15, energized by a source 16, to a pilot photocell 17, energized by a source, is also interrupted by chopping disc 14 concurrently with interruptions of the radiation beam from source 1, and the output of photocell 17 is utilized to rectify synchronously the amplified output of detector 7, as will be described in detail in connection with Fig. 2.

In practice, the source of light 15 and the pilot photocell 17 are mounted on a common mounting means 80 so that they may be adjusted circumferentially of the disc 14 relative to the aligned light source 1 and inlet slit 1A of the spectrograph 3. For this purpose, the light source 1 is mounted in line with the inlet slit 1A so that the enlarged half 81 of the disc 14, not having the ring portion removed, may chop off the beam from the light source 1 during half of each revolution of the disc 14. In general, the light source 15 for producing the fixed beam is similarly mounted above the disc in the same radial position as the light source 1 substantially diametrically thereof and the photocell 17 is mounted below the disc in alignment with the fixed light source 15 so that the beam thereof will be chopped off during the opposite half revolution of each revolution of the disc 14.

For this purpose, I provide a bracket 80 having its inner end 82 pivotally mounted on the pivot bearing 84 mounted on the device along the axis 86 of the rotating disc 14 to have the bracket arm 85 thereof project radially outwardly of said disc, having the portion 88 projecting upwardly from beyond the edge of the disc and the inturned end 90 projecting radially inwardly over said outwardly extending arm 85. The light source 15 is mounted by any suitable means on said arm 90 immediately above the photocell 17 which is mounted on the arm 85 immediately below it with the portion of large area 81 of said disc adapted to extend on each half revolution thereof between the light source 15 and photocell 17 so as to chop off the beam of light during the opposite half revolution of each revolution of said disc 14. The bearing shaft 92 for said bracket 80 is frictionally mounted in said bearing 84 along the axis of said disc 14 and it is obvious that the phase of interruptions of the fixed beam 15 may be adjusted relative to the phase of the interruptions of the beam to be measured by rotating the bracket 80 forwardly or rearwardly of its normal position diametric of said light source 1.

Fig. 2 illustrates the amplifier and rectifier parts utilized to effect the amplification and inphase rectification of the output of detector 7. The fluctuating voltage appearing at the output of detector 7 and conducted by leads 10 is amplified by a conventional three-stage amplifier comprising triodes 73 and 74, and output triode 19. A portion of the output of triode 19, which will be referred to as the amplifier output, is impressed on the control grid of a rectifying triode 21 through a condenser 22 and a resistor 23. Likewise a portion of the output voltage of amplifying triode 19 is impressed on the control grid of a phase inverter 24, which consists of an amplifying triode (the overall amplification of which, when measured from the plate of triode 19 to the plate of said inverter, is adjusted for unity by means of potentiometer 26), through a condenser 25 and said potentiometer 26. A portion of the output of the inverter 24, which is provided with a cathode resistor 27 and plate resistor 28, is impressed on the grid of a rectifying triode 29 through a condenser 30 and a grid resistor 31. The values of the circuit elements 22, 23, 25, 27, 28, 30 and 31, are selected in such a manner that the amplifier output, impressed on the grid of rectifying triode 21, and the phase inverter output at the grid of rectifying triode 29, are equal in magnitude but are 180° out of phase. Said portion of the amplifier output impressed on the grid of rectifying triode 21 and said portion of the output of phase inverter 24 are illustrated as Figs. 4c and 4d respectively. The wave shapes illustrated in Figs. 4c and 4d are essentially sinusoidal in character, because they represent the selective response of the detector 7 to the fundamental component only of the chopped radiation beam, while the response of the detector to the odd harmonics of the radiation signal is assumed to be negligibly small.

The output signal from pilot photoelectric cell 17 and conducted by leads 32 is used for controlling a flip-flop circuit built around the switching triodes 33 and 34. The plate output of triode 33 is connected to the control grid of triode 34 and the two cathodes of triodes 33 and 34 are connected together and grounded through a cathode follower 35. The control grid of triode 33 is connected to the cathode of the synchronizing photocell 17 and to ground through a resistor 36. When photocell 17 is excited by the light from lamp 15 the voltage developed across resistor 36 will make triode 33 conductive, which will cause the voltage of the grid of triode 34 to be sufficiently below the voltage of the two connected cathodes of triodes 33 and 34 so that triode 34 will be non-conductive. Therefore, at this instant, the common cathode resistor 35 will carry only the space current of triode 33. The value of resistor 36 is chosen sufficiently high so that the rise in the voltage of the grid of triode 33 will be halted only when grid conduction occurs. This will "clamp" the voltages at both the common cathode and at the plate of triode 33, since any additional current from photocell 17 will be almost entirely conducted away by the grid current from the cathode of triode 33. If now chopping disc 14 interrupts the light beam between light source 15 and photocell 17, the grid of triode 33 will drop to ground potential, and the voltages at the plate of triode 33 and, consequently, at the grid of triode 34 will rise. This will cause conduction through triode 34 and maintain the common voltage of the two cathodes at a sufficiently high value above ground potential so that triode 33 will be effectively cut off. It is thus seen that as chopping disc 14 interrupts periodically the light beam between source 15 and photocell 17, two sharply defined square waves, illustrated as Figs. 4a and 4b, 180° out-of-phase, will be produced at the plates of triodes 33 and 34. Portions of the square wave voltages thus produced at the plates of 33 and 34 are impressed on the grids of triodes 21 and 29 respectively, through the resistors 37 and 38, respectively, so that these triodes will be made alternately conductive. The superimposed voltages contributed to the grids of rectifying triodes 21 and 29 by the output of triode 19 and the output of phase inverter 24, respectively, will make these rectifying triodes 21 and 29 more conductive whenever these amplifier and phase inverter outputs have correspondingly larger amplitudes to produce a greater output current in common cathode resistors 39 and 41. The superimposed voltages at the grids of triodes 21 and 29 are illustrated by the full and the dotted curves of Fig. 4e, respectively, and the combined cathode output of said triodes is illustrated by the curve of Fig. 4f.

If the radiating element 1 were replaced by an object colder than the chopping disc, the voltage output curves illustrated by Figs. 4c and 4d would be much smaller and interverted, and the output current curve illustrated by Fig. 4f would then take the appearance illustrated by Fig. 4g. This indicates that as long as the trough of the curve is reasonably above the zero line, the average output would still represent a linear measure of the radiation to be measured. Thus, linearity through the zero value of the radiation to be measured is assured.

Potentiometer 26 serves to equalize the amplitudes shown in 4c and 4d. Likewise adjustable resistor 38 serves to equalize the higher values of 4a and 4b, as delivered at the grids of triodes 21 and 29. When the amplitudes have the above mentioned relationships, the combined output of triodes 21 and 29 will contain an A. C. ripple, the fundamental frequency of which is equal to twice the interrupting frequency of chopping disc 14. This ripple is filtered out to ground by a condenser 40. Part of the output of the rectifier is bled to —A through a resistor 41, and the remaining output is fed, after filtering by condenser 40, through a resistor 43 to the Ayrton shunt formed by a potentiometer 44 and a resistor 45. Potentiometer 44 is used for adjusting the sensitivity of the entire system. A recorder 72 is connected across this shunt through conductors 47 and 48. The advantage in using the Ayrton shunt resides in the fact that the amplitude of the input signal into the recorder can be adjusted without altering the matched impedance relationship between the shunt and the impedance of the recorder as long as the impedance of resistance 43 is sufficiently high compared to the shunt impedance of potentiometer 44 and resistor 45. Additional potentiometers 49 and 50 are used for adjusting the D. C. level recorded by the recorder in the absence of signals and can be adjusted so as to minimize the effect of the "A" and "B" battery drifts on the recorder.

Figs. 1 and 2 thus disclose a spectrophotometer capable of giving quantitative radiation transmission properties of the absorption cell 2 as a function of wave length. The quantitative data is obtained from the amplitude of the signal recorded, while the wavelength for which this signal is recorded is obtained from the known relation between the setting of spectrograph 3 and the position of the recording chart within the recorder.

Figure 5:
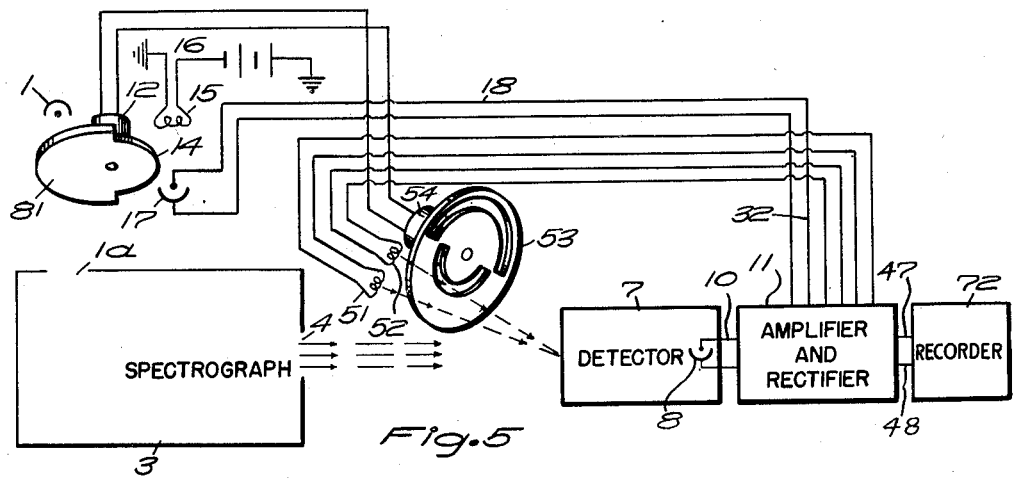
Fig. 5 is a diagrammatic view shown in perspective and blocks of a modified form of my invention employing an inverse radiative feed back.

Fig. 5 illustrates a modification of the arrangement illustrated by Fig. 1. In the arrangement of Fig. 5, the sensitive element 8 of detector 7 is exposed alternately to the radiations from two light sources 51 and 52, which are interrupted in turn by a chopping disc 53 which is actuated by a motor 54 which receives its motive power from the same source as motor 12. Chopping disc 53 rotates synchronously with disc 14, and the phase relationship of the two discs is such that the radiations from sources 1 and 51 are allowed to pass and are interrupted simultaneously, and the radiations from source 52 are allowed to pass and are interrupted alternately therewith. Chopping discs 14 and 53 could also be the one and same disc, if the latter arrangement were optically convenient, or if means were used to pipe the light from sources 51 and 52 and interrupted by disc 53 to detector 7.

Figure 6:
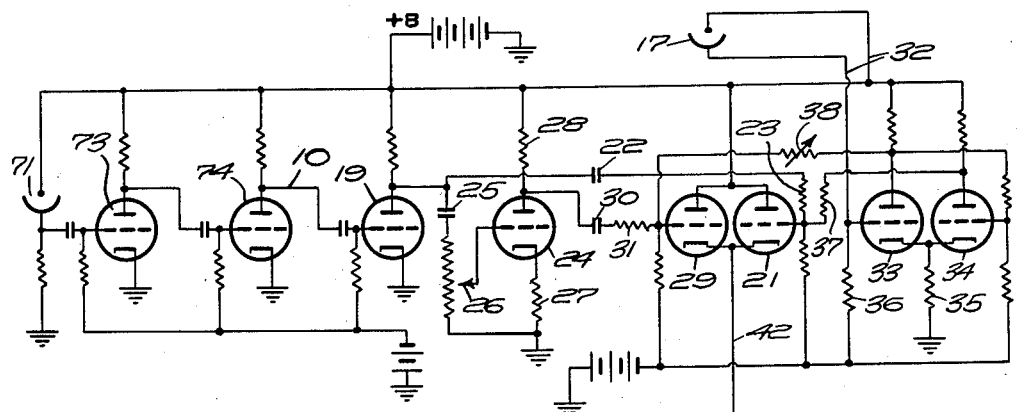
Fig. 6 is an electric diagram of the inverse feed back circuit shown in Fig. 5.

Fig. 6 illustrates the modification of the circuit of Fig. 2, necessary to the operation of the modification shown in Fig. 5, in which provision is made for the differential energization of sources 51 and 52. This is accomplished by introducing the current through traversing resistor 43 at the common junction of the leads of sources 51 and 52, so that a portion of said current is added to the energizing current of source 52, while another portion of said current is subtracted from the energizing current of source 51. Adjustable potentiometer 80 serves to adjust differentially the currents of 51 and 52.

Figure 7:
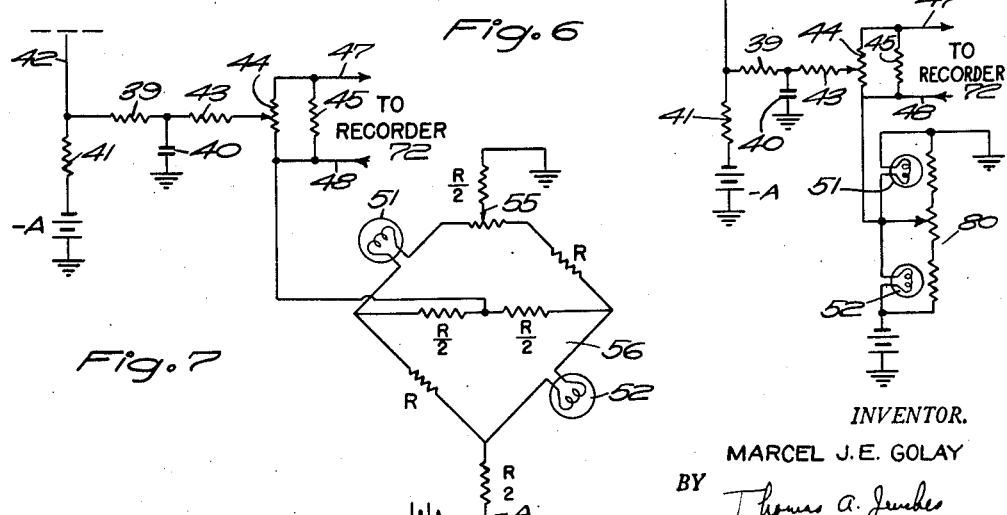
Fig. 7 is an electric diagram illustrating an alternate design of a portion of the circuit shown in Fig. 6.

Fig. 7 illustrates a modification of the portion of the circuit of Fig. 5 in which provision is made for the differential energization of sources 51 and 52.

In the circuit of Fig. 7, the output current carried by resistor 43 is passed through an Ayrton shunt, out of which a controllable fraction of said output is shunted through the recorder 72, and then fed to the center of the bridge circuit 56, two arms of which are formed by sources 51 and 52. Sources 51 and 52, which may be incandescent filament lamps, are preferably so chosen that their resistances when energized, are in the neighborhood of the characteristic resistance R of the bridge circuit.

It will be readily seen that any positive current flowing through resistor 43 to the bridge circuit will tend to increase the flow of current through 52 and decrease the flow of current through 51, thus causing an incremential fluctuation of radiation on detector 7 equivalent to a decrease of the fluctuating radiation received from the spectrograph. As this will tend to decrease the output current through lead 42, the overall function of sources 51 and 52 will be that of an inverse feed back loop. If the degenerative action of this loop is large, any increment of fluctuating radiation from the spectrograph will be nearly compensated by the differential radiative action of the bridge circuit, so that the detector and its associated circuits will act nearly as a null instrument, while the current flowing through 42 will nearly entirely be determined by the feed back loop formed by the bridge circuit, and very little affected by variations in the overall sensitivity of the detector and its associated circuits, up to and including the Ayrton shunt. On the other side, it will be important to control accurately the voltage of source —A, as the differential energy dissipated in sources 51 and 52 will be very nearly equal to one quarter of the product of said voltage, by the current through lead 42.

Potentiometer 55 serves to adjust the differential action of sources 51 and 52 so as to adjust the zero reading of the recorder to the desired value.

In place of the triodes shown, it is obvious that any suitable form of electronic tube may be employed.

It is understood that my invention is not limited to the specific apparatus shown or methods described and that various deviations may be made therefrom without departing from the spirit and scope of the appended claims.

What I claim is:

1. The method of measuring radiation with the substantial elimination of drift which comprises periodically interrupting the radiation to be measured, producing a fluctuating radiation voltage, the amplitude of fluctuation of which is caused by and is a function of said interrupted radiation, interrupting a fixed beam of radiation in time relationship with the interruptions of said radiation to be measured, producing a synchronizing fluctuating voltage having a substantially constant amplitude of fluctuation and having its phase determined by the interruptions of said fixed beam, superposing said fluctuating radiation voltage on said synchronizing voltage and rectifying said superposed voltages to produce a direct electrical current providing a measure of said radiation.

2. The method according to claim 1 in which the relative phases of interruptions of said fixed beam and said radiation to be measured are adjusted to bring the fluctuations of said voltages into phase.

3. The method according to claim 1 in which the average value of said direct electrical current varies substantially linearly with said radiation to be measured.

4. The method according to claim 1 in which the radiation to be measured is periodically interrupted for periods which are of substantially equal duration as the periods of non-interruption and in which the fluctuating voltage, the phase of which is determined by the interruptions of said fixed beam of radiation, consists of substantially square waves of substantially constant amplitude and having high voltage periods and low voltage periods which are substantially equal to each other and to the interruption and non-interruption periods of said radiation to be measured.

5. The method according to claim 1 in which a portion of said rectified fluctuating current is superposed additively and subtractively, respectively, on the energizing current of two sources of radiation, interrupting part of the radiation from whichever of said two sources is weakened by said portion of said fluctuating electrical current simultaneously with interruptions of said radiation to be measured, interrupting part of the radiation from the other source when the radiation to be measured is not interrupted, superposing a part of said periodically interrupted radiation from said sources on the radiation to be measured at the point of conversion of said radiation to be measured into a direct electrical current to feed back a respective differential of the output current to limit the amount of errors.

6. The method of measuring radiation which comprises periodically interrupting the radiation to be measured, transforming the modulations of said interrupted radiation into variations in an output electrical current, which forms a measure of said radiation, and feeding back with the radiation to be measured a radiative differential, which is a function of said radiation output current, which affects subtractively the radiation to be measured.

7. The method of measuring radiation which comprises periodically interrupting the radiation to be measured, transforming the modulations of said interrupted radiation into variations in an output electrical current, which forms a measure of said radiation and superimposing on the fluctuations of the radiation to be measured another fluctuating radiation which is a function of said output electrical current and which acts differentially with said radiation to be measured.

8. In an apparatus for effecting a substantially drift free measurement of radiation, means for periodically interrupting the radiation to be measured, means to produce a fluctuating voltage, the amplitude of fluctuation of which is a function of said interrupted radiation, means for periodically interrupting a separate fixed source of radiation, means for producing another fluctuating voltage having a substantially constant amplitude of fluctuation and having the same phase as the interruptions of said fixed beam, means to superpose said fluctuating voltage of the radiation to be measured on said synchronizing fluctuating voltage, and means for rectifying said superposed voltages to produce a direct electrical current providing a measure of said radiation.

9. Apparatus according to claim 8, in which a fluctuating electrical current is produced, the average value of which varies substantially linearly with said radiation to be measured.

10. Apparatus according to claim 8, having means to adjust the relative phases of interruptions of said fixed beam and interruptions of said radiation to be measured to cause phase coincidence of said voltages.

11. Apparatus according to claim 8, having two auxiliary sources of radiation, means for superposing portions of said fluctuating electrical measuring current additively, and subtractively, respectively, on the energizing electrical current of said two auxiliary sources of radiation, means for periodically interrupting a portion of the radiation from the subtractively effected auxiliary source in synchronism and in phase with the interruptions of the radiation to be measured, means for periodically interrupting a portion of the radiation from said other auxiliary source in synchronism but 180° out of phase with the interruptions of radiation to be measured, and means for superposing a portion of said interrupted radiations from said two auxiliary sources on the radiation to be measured.

12. Apparatus according to claim 8, in which the radiation to be measured is periodically interrupted for periods which are of substantially equal duration as the periods of non-interruption and in which the fluctuating voltage of said fixed beam of radiation comprises substantially square waves of substantially constant amplitude and having high voltage periods and low voltage periods which are substantially equal to each other and to the interruption and non-interruption periods of said radiation to be measured.

13. In an apparatus for effecting a substantially drift free and linear measurement of radiant energy, means for periodically interrupting the radiation to be measured for periods which are of substantially equal durations and of the same durations as the periods of non-interruption, means for providing a first fluctuating electrical voltage, the amplitude of fluctuation of which is a function of said interrupted radiation, two rectifying electronic tubes, means connecting said first fluctuating voltage to the control grid of said first rectifying electronic tube, means for providing from said first fluctuating electrical voltage a second fluctuating electrical voltage which has substantially the same fluctuation amplitude as, but is 180° out of phase with said first fluctuating electrical voltage, means connecting said second fluctuating voltage to the control grid of said second rectifying electronic tube, which has substantially the same electrical characteristics as said first electronic tube and the cathode of which is directly connected with the cathode of said first electronic tube, a fixed source of radiation, a photosensitive electrical cell, means for alternately obstructing and opening the optical path between said fixed source and said photo-sensitive electrical cell for periods of time which are substantially equal to each other and to the on and off periods of the radiation to be measured, and which bear a constant time phase relationship to the interruptions of said radiation to be measured, means for converting the electrical signals from said cell into two substantially square wave voltages, 180° out of phase with respect to each other, means for superposing a first signal voltage proportional to said first square wave voltage on said first fluctuating voltage at the grid of said first electronic tube, the lower value of said first signal voltage being such as to substantially cut off the space current of said first electronic tube, and the higher value of said signal voltage being such as to cause substantial conductivity of said first electronic tube, the lower value of said second square wave voltage being such as to substantially cut off the space current of said second electronic tube and the higher value of said second square wave voltage being such as to cause substantial conductivity of said second electronic tube, means for so adjusting the relative phases of said square wave voltage and fluctuating electrical voltages that the higher value of said first square wave voltage coincides substantially with that half period of said first fluctuating voltage during which said first fluctuating voltage has the highest possible average value, means for superposing a second signal voltage which represents an adjustable fraction of said second square wave voltage on said second fluctuating voltage at said control grid of said second electronic tube, a resistance element between the junction of said cathodes and an electrical ground, means for so adjusting the average conduction producing voltages at said control elements of said electronic tubes that the fundamental sinusoidal component of the current signal in said resistance element is minimized, means for filtering the remaining fundamental component and the higher harmonics out of said current signal, and means for utilizing a portion of said filtered current signal to effect a measurement of said radiation to be measured.

14. In an apparatus substantially as described in claim 13, additional means designed to increase the linearity and the constancy of the relationship between the radiation to be measured and a measurement of said radiation as follows: comprising two auxiliary sources of radiation, means for superposing a portion of said signal current additively and subtractively, respectively, on the energizing current of two auxiliary sources of radiation, means for periodically interrupting a portion of the radiation from the subtractively affected auxiliary source of radiation in synchronism and in phase with the interruptions of said radiation to be measured, means for periodically interrupting a portion of the radiation from the other said auxiliary source in synchronism but 180° out of phase with the interruptions of said radiation to be measured, and means for superposing a portion of the interrupted radiation from said auxiliary sources of radiation on said interrupted radiation to be measured, at the point of conversion of said radiation to be measured into a fluctuating electrical signal.

15. In an apparatus for effecting a substantially drift free linear measurement of radiation, a spectrograph, having an entrance slit and an exit slit, a fixed source of light in line with said entrance slit of said spectrograph, a rotating disc having sides of different radii for chopping said beam of light during half revolutions thereof, a detector for picking up said interrupted radiation to be measured after it is passed through said spectrograph to produce a fluctuating electrical voltage in a circuit connected thereto, the amplitude of fluctuation of which is caused by and is a function of said interrupted radiation, a fixed source of light passing through the reduced edge of said disc, a photocell below said disc in the path of said fixed beam of light interrupted by rotation of said disc during half revolutions thereof, an electric circuit actuated by said photocell, an amplifying tube connected in said detector circuit to provide a fluctuating voltage responsive to said fluctuations in the radiation to be measured, a phase inverter connected to said detector circuit to produce a similarly fluctuating voltage in inverted phase to said first fluctuating voltage in response to said interruptions in the radiation to be measured, a flip-flop circuit connected to said photocell circuit creating a synchronizing fluctuating voltage in response to interruptions in said fixed beam, comprising two switch tubes so connected as to provide two square wave fluctuating voltages in inverted phase, means to connect said first amplifying tube and said phase inverting tube and the flip-flop tubes to superimpose the four respective voltages pair by pair upon each other to provide a superimposed A. C. fluctuating voltage comprising alternative fluctuations of equal length and height, and two rectifying tubes having their outputs connected together and their grids connected to said paired voltages to change the fluctuating alternating voltages into fluctuating direct current having fluctuations having flat ends and curved tops responsive to said interruptions and to the strength of the radiation to be measured, a filtering circuit connected to the output of said rectifying tubes, and an Ayrton shunt circuit connected to said filtering circuit and feeding a recorder.

16. In an apparatus for measuring radiation, means for periodically interrupting the radiation to be measured, means for transforming the modulations of said interrupted radiation into variations in an output electrical current which forms a measure of said radiation and means for feeding back with the radiation to be measured a radiative differential which is a function of said radiation output current, and which affects subtractively the radiation to be measured.

17. In an apparatus for measuring radiation, means for periodically interrupting the radiation to be measured, means for transforming the modulations of said interrupted radiation into variations in an output electrical current which forms a measure of said radiation and means for superposing on the fluctuations of the radiation to be measured another fluctuating radiation which is a function of said output electrical current and which acts differentially with said radiation to be measured.

18. The method of measuring radiation with the substantial elimination of drift which comprises periodically interrupting the radiation to be measured, transforming modulations of said interrupted radiation into a fluctuating radiation voltage, the amplitude of fluctuation of which is a function of said interrupted radiation, interrupting a fixed beam of radiation in time relationship with the interruptions of said radiations to be measured, transforming modulations of said interrupted radiation of said fixed beam into a synchronizing fluctuating voltage having a substantially constant amplitude of fluctuation and having its phase determined by epochs of the interruptions of said fixed beam, superposing said fluctuating radiation voltage on said synchronizing fluctuating voltage and rectifying said superposed voltages to produce a direct electrical current providing a measure of said radiation.

19. In an apparatus for producing a substantially drift free measurement of radiation, means for periodically interrupting the radiation to be measured, means for transforming the modulations of said interrupted radiation into a fluctuating radiation voltage, the amplitude of fluctuation of which is a function of said interrupted radiation, means for periodically interrupting a separate fixed beam of radiation in time relationship with the interruptions of said radiations to be measured, means for transforming modulations of said interrupted radiation of said fixed beam into a synchronizing fluctuating voltage having a substantially constant amplitude of fluctuation and having its phase determined by the interruptions of said fixed beam, means to superpose said fluctuating radiation voltage on said synchronizing fluctuating voltage and means for rectifying said superposed voltages to produce a direct electrical current providing a measure of said radiation.

20. The method of measuring radiation which comprises periodically interrupting the radiation to be measured, transforming the interruptions of said radiation into variations in an electrical current, producing concurrently with said interruptions of said radiation an accessory electrical current fluctuation of fixed amplitude and characterized by the same fundamental frequency as said modulation, and combining said electrical current and said accessory electrical current so as to obtain an output electrical current which forms a measure of said radiation.

21. In an apparatus for measuring radiation, means for periodically interrupting the radiation to be measured, means for transforming the interruptions of said radiation into an electrical current, means for producing concurrently with said interruptions an accessory electrical current fluctuation of fixed amplitude characterized by the same repetition rate as said interruptions, and means to combine said electrical current and said accessory electrical current so as to obtain an output electrical current which forms a measure of said radiation.

MARCEL J. E. GOLAY.

REFERENCES CITED

The following references are of record in the file of this patent:

UNITED STATES PATENTS

| Number | Name | Date |
|---|---|---|
| 1,672,671 | Young | June 5, 1928 |
| 1,806,199 | Hardy et al. | May 19, 1931 |
| 1,934,187 | Glasgow et al. | Nov. 7, 1933 |

Certificate of Correction

Patent No. 2,502,319                                                    March 28, 1950

MARCEL J. E. GOLAY

It is hereby certified that error appears in the above numbered patent requiring correction as follows:

In the grant, line 3, address of inventor, for "Long Branch, New York" read *Long Branch, New Jersey*;

and that the said Letters Patent should be read with this correction therein that the same may conform to the record of the case in the Patent Office.

Signed and sealed this 16th day of May, A. D. 1950.

[SEAL]

THOMAS F. MURPHY,
*Assistant Commissioner of Patents.*